No. 651,372. Patented June 12, 1900.
J. McC. LORD.
HORSESHOE.
(Application filed Mar. 2, 1899. Renewed Nov. 16, 1899.)
(No Model.)
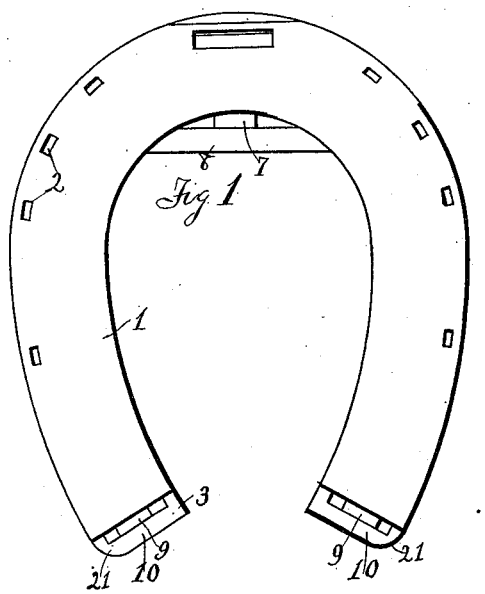
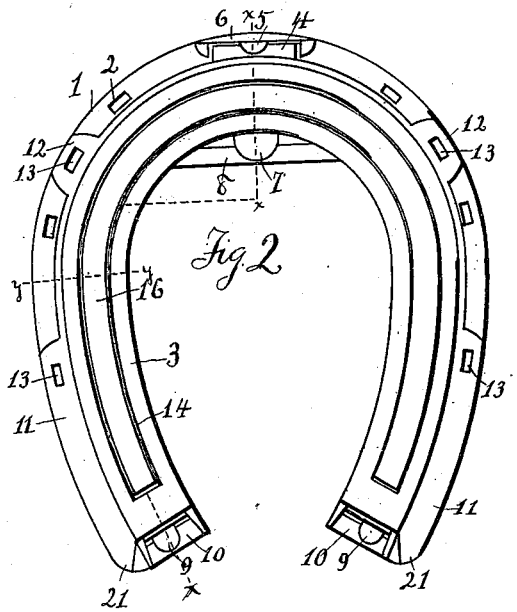
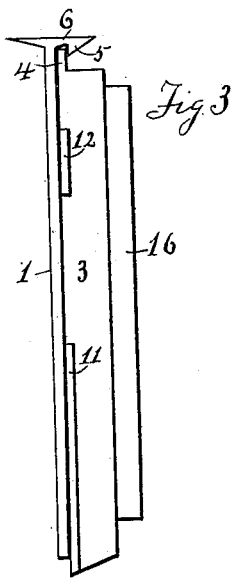
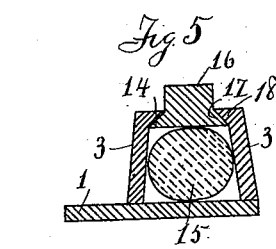
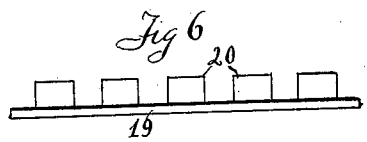
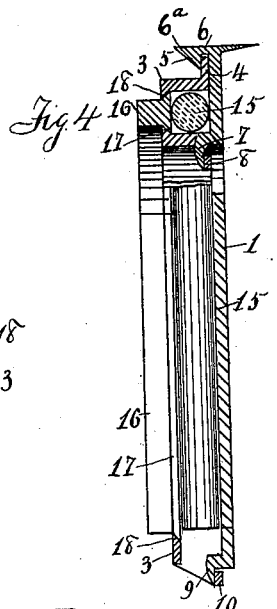
Witnesses
O. A. Lucas
J. V. Dille
Inventor
John McC. Lord
by
J. S. Brown
Attorney
THE NORRIS PETERS CO., PHOTO-LITHO., WASHINGTON, D. C.

UNITED STATES PATENT OFFICE.

JOHN McC. LORD, OF KANSAS CITY, MISSOURI.

HORSESHOE.

SPECIFICATION forming part of Letters Patent No. 651,372, dated June 12, 1900.

Application filed March 2, 1899. Renewed November 16, 1899. Serial No. 737,250. (No model.)

*To all whom it may concern:*

Be it known that I, JOHN McC. LORD, a citizen of the United States, residing at Kansas City, in the county of Jackson, in the State of Missouri, have invented certain new and useful Improvements in Horseshoes, of which the following is a full, clear, and exact description, reference being had to the accompanying drawings, which form a part of this specification.

My invention relates to certain new and useful improvements in horseshoes, having more particular reference to that class of horseshoes intended for use upon roadsters, trotting and racing horses, and the like, the intent of the invention being to provide in a new peculiar manner a resilient or elastic bearing for the foot of the horse which in striking the hard road, track, or pavement shall prevent the shock or concussion incident thereto and which is frequently very seriously injurious to the foot, leg, and joints of the horse and always more or less so; and my invention consists in certain features of novelty hereinafter described, and pointed out in the claims.

Figure 1 represents a view of the upper face or face of the shoe which is next to the hoof. Fig. 2 represents a view of the bottom of the shoe. Fig. 3 represents a side or edge view of the same. Fig. 4 represents a view, partly in cross-section, on the line $xx$ of Fig. 2. Fig. 5 represents a cross-section on the line $yy$ of Fig 2. Fig. 6 represents an elevation of a portion of a track-bar provided with studs to form a winter shoe.

Similar numerals refer to similar parts throughout the several views.

1 represents the hoof-plate, which is a flat thin plate of suitable width to carry the other parts, fitted to the hoof and secured thereon by nails through the nail-holes 2 in the usual manner.

3 represents a casing formed to the shape of the shoe, having an open side next to the hoof-plate and secured upon the hoof-plate at the toe by the toe-flange 4 on said casing engaging the ear 5 on the toe-piece 6 on the hoof-plate and by the lug 7 on the hoof-plate engaging the bar 8 on said casing and at the heel by the lugs 9 on said hoof-plate engaging the bars 10 on said casing. Said casing is also provided with the flanges 11 and the ears 12, having nail-holes 13 corresponding to nail-holes in the hoof-plate through which pass nails, whereby said casing is, with said hoof-plate, secured upon the hoof. Said casing has also an opening 14 in its bottom.

15 represents a backing or cushion, of rubber or like elastic material, shaped to the shoe and arranged in the cavity of said casing bearing against the hoof-plate. This elastic bar is preferably of such shape and size as to permit of its expansion under compression within said cavity. In the drawings it is shown as slightly oval in form; but it may be semicircular or conical in form with the same result.

16 represents a track-bar, of steel or like material, shaped to the shoe, extending through the opening 14 in the casing and retained therein by the flange 17 engaging the flanged rim 18 of said casing along said opening and resting or abutting against said elastic backing within said cavity. Said elastic backing is of such rigidity and said track-bar protrudes to such extent beyond said casing that under the weight of the horse as thrown on the foot wearing the shoe said track-bar will first strike the pavement, and said elastic bar will yield sufficiently to break the force of the shock and concussion of the foot upon the pavement. Said track-bar instead of being formed as a continuous bar extending beyond the opening in the casing, as shown in Figs. 2, 3, and 4, may, as shown in Fig. 6, be formed of a thin bar 19, provided with a series of studs 20, formed integral with or secured thereupon, and thus providing a very efficient winter shoe to retain a secure foothold upon an icy pavement.

The toe-piece 6, besides serving to support and carry the lug 7, serves also to provide a fender 6ª to protect the casing and to take the force of any blow against the toe and distribute it over the parts and prevent the separation of the casing from the foot-plate, which might occur if such blow were received upon the casing, the force of such blow being taken by all the nails instead of the casing-nails only.

The casing at the heel may be extended beyond the hoof-plate and rounded at the outer corners, as shown at 21, thus providing additional protection and preventing wear and tear in this direction.

The casing 3, the nails through the nail-holes 13, by which it is secured to the hoof, being removed, may be detached from the hoof-plate and a new elastic backing inserted in the cavity or a new track-bar in the opening and the casing reattached to the hoof-plate by means of the lugs, as before described, without removing the hoof-plate and with removal of but half the shoe-nails, this constituting one of the important features and principal advantages of my invention. Another important feature will be observed in that the track-bar being of steel or like hard material and hard and unyielding in itself is backed by and rests upon a resilient or elastic cushion, this forming a combination in which durability and elasticity are secured.

Having thus fully described my improvements, what I claim as my invention is—

1. A horseshoe consisting of a hoof-plate, a casing having an open side next the hoof-plate and a longitudinal opening in its bottom detachably secured upon said hoof-plate, an elastic cushion arranged in the cavity of said casing, and bearing against said hoof-plate, and a track-bar arranged in said opening in said casing and bearing against said cushion, substantially as set forth.

2. A horseshoe consisting of a hoof-plate, a casing having an open side next the hoof-plate and a longitudinal opening in its bottom detachably secured upon said hoof-plate, and provided with lateral flanges and ears having nail-holes therein corresponding to the nail-holes in said hoof-plate whereby said casing is adapted to be secured with said hoof-plate upon the hoof, an elastic cushion arranged in the cavity of said casing, and bearing against said hoof-plate, and a track-bar arranged in said opening in said casing, and bearing upon said cushion, substantially as set forth.

3. A horseshoe consisting of the combination with a hoof-plate, of a casing provided with suitable bars for attaching the same to the hoof-plate, lugs on the hoof-plate engaging said bars, and having an open side next said hoof-plate, and a longitudinal opening in its bottom, an elastic cushion arranged within the cavity of said casing and bearing against said hoof-plate, and a track-bar arranged in said opening in said casing and bearing against said cushion, substantially as set forth.

4. A horseshoe consisting of a hoof-plate, a casing detachably secured to said hoof-plate having an open side next said hoof-plate and a flanged opening in its bottom, an elastic cushion arranged in the cavity of said casing bearing against said hoof-plate, and a flanged track-bar arranged in said opening in said casing and bearing against said cushion, substantially as set forth.

5. A horseshoe consisting of a hoof-plate, a casing detachably secured to said hoof-plate, having an open side next the hoof-plate and a longitudinal opening in its bottom, an elastic cushion arranged in the cavity of said casing, and a bar in said cavity bearing against said cushion along said opening and provided with a series of studs protruding through said opening, substantially as set forth.

6. A horseshoe consisting of a hoof-plate, a casing detachably secured upon said hoof-plate provided with a flange at the toe thereof and having an open side next the hoof-plate and a longitudinal opening in its bottom, a toe-piece on said hoof-plate forming a fender to protect said casing and provided with a lug arranged to engage said flange on said casing, an elastic cushion arranged in the cavity of said casing and bearing against said hoof-plate, and a track-bar arranged in said longitudinal opening in said casing and bearing against said cushion; subsiantially as set forth.

JOHN McC. LORD.

Witnesses:
O. A. LUCAS,
J. V. DILLE.